Nov. 24, 1970   R. D. HOUK   3,541,877
SINGLE LEVER CONTROL FOR COORDINATING MULTIPLE
MOTION TRANSMITTING DEVICES
Filed Jan. 23, 1969   5 Sheets-Sheet 1

INVENTOR.
RICHARD D. HOUK
BY Hamilton, Cook,
Renner & Renner
ATTORNEYS

Nov. 24, 1970 R. D. HOUK 3,541,877
SINGLE LEVER CONTROL FOR COORDINATING MULTIPLE
MOTION TRANSMITTING DEVICES
Filed Jan. 23, 1969 5 Sheets-Sheet 2

INVENTOR.
RICHARD D. HOUK
BY
Hamilton, Cook,
Renner & Kenner
ATTORNEYS

INVENTOR.
RICHARD D. HOUK
BY Hamilton, Cook,
Renner & Renner
ATTORNEYS

INVENTOR.
RICHARD D. HOUK
BY *Hamilton, Cook.*
*Renner & Renner*
ATTORNEYS

INVENTOR.
RICHARD D. HOUK
BY Hamilton, Cook,
Renner & Kenner
ATTORNEYS

United States Patent Office

3,541,877
Patented Nov. 24, 1970

3,541,877
SINGLE LEVER CONTROL FOR COORDINATING MULTIPLE MOTION TRANSMITTING DEVICES
Richard D. Houk, 3874 Kenwood Ave., Stow, Ohio 44224
Filed Jan. 23, 1969, Ser. No. 793,439
Int. Cl. G05g 9/00
U.S. Cl. 74—471                                      11 Claims

ABSTRACT OF THE DISCLOSURE

A control unit for coordinated actuation of two motion transmitting devices. The control unit has a beam supported across its housing with a yoke mounted on the beam. The yoke has a pair of arm means to which the motion transmitting devices are respectively connected. A control lever rotates the yoke about a first axis defined by that of the beam and/or a second axis transversely of the first. The control lever cooperates with a guide plate aperture to maintain a coordinated limitation of the yoke rotation about one axis with respect to the other, thereby to effect coordinated actuation of the two motion transmitting devices.

BACKGROUND OF THE INVENTION

A single lever control for coordinated actuation of two motion transmitting means, such as push-pull control cables.

The past several decades have witnessed extensive changes in the design concepts of heavy duty vehicles. Not only has the size of such vehicles been increased considerably but such vehicles are now often multi-powered. For example, tracklayer vehicles such as bull-dozers, may employ a power unit for each track with steering being accomplished by coordinated regulation of the transmitted power from the power units to the two tracks.

Historically, the standard arrangement for tracklayer vehicles was to employ a single power unit connected through a single mechanical transmission to drive the two tracks. Steering was effected by a pair of steering control levers, one for each track, that controlled the respective speed thereof through a clutching mechanism, or, sometimes, a brake assembly.

The working devices on tracklayer vehicles, such as the blade or bucket, also require one, or more, levers so that if the working device is being operated while the tracklayer vehicle is in motion, the operator is required to operate the two steering control levers with only one hand. Selection of direction and/or power range is generally effected by a fourth, or gear shift, lever, and that further complicates the necessary manual manipulations of the operator. In addition, of course, a fifth, or throttle, lever is provided that must also be occasionally adjusted.

To eliminate the gear shift lever and reduce the necessity of throttle adjustment, a hydrostatic transmission may be provided between the power source, whether individual or multiple, and each track.

Briefly, hydrostatic transmissions employ a hydraulic pump to operate a hydraulic motor. Both the pump and motor usually utilize multiple pistons oriented axially in spaced relation about the circumference of a circle centered on the rotational axis of the respective pump and motor rotors. A prime mover, or power source, rotates the pump rotor and effects reciprocation of the pistons therein against a pump swash plate to force the hydraulic fluid from the pump into the motor. The admission of the hydraulic fluid, under pressure, from the pump into the motor reciprocates the pistons in the latter against a motor swash plate to effect rotation of the motor rotor which is operatively connected to the device being driven.

In some varieties of hydrostatic transmissions the inclinations of both swash plates may be varied, but in many only the inclination of one of the swash plates may be varied. When the inclination of only one swash plate can be varied—i.e., stroked—it is generally that swash plate associated with the pump. Hydrostatic transmissions of this latter construction are referred to generally as variable-pump, fixed-motor varieties. In any event, variation of swash plate inclination directly varies the displacement per stroke of the pistons acting thereagainst so that speed, and inversely, power, transmitted through the hydrostatic transmission can be infinitely varied by controlling swash plate inclination. Swash plate inclination also controls the direction in which the motor rotor rotates.

Even with the advantages thus inherent to the employment of hydrostatic transmissions for tracklayer vehicles, presently available control units require a control lever for each track so that the operator has, heretofore, nevertheless been required to operate the two steering controls by one hand while the other hand manipulated the control lever, or levers, required for the working device.

Although air, hydraulic, electric and mechanical controls have been variously employed to stroke the swash plate of hydrostatic transmissions, only the mechanical controls afford the operator with the desired tactile sensitivity.

SUMMARY OF THE INVENTION

It is, therefore, the primary object of the present invention to provide a mechanical, single lever control for effecting coordinated actuation of two motion transmitting devices adapted to stroke two hydrostatic transmissions in each of which the inclination of only one swash plate is variable.

It is another object of the present invention to provide a control unit, as above, that protects against effecting incompatible actuation of the motion transmitting devices so that the two hydrostatic transmissions can not be stroked to drive in directions and at speeds incompatible with their environment.

These and other objects which will become apparent from the following specification are accomplished by means hereinafter described and claimed.

In general, a control unit embodying the concept of the present invention has a housing in which a beam supports a yoke. The yoke is rotatable both about a primary axis defined as the axis of the beam and a secondary axis transversely the primary axis. Rotation of the yoke about either axis, or both, is effected by a control lever secured to the yoke and extending through the aperture of a gate plate, the interaction with which limits rotation of the yoke about the secondary axis with respect to the degree of rotation effected about the primary axis throughout the range thereof.

The subject control unit has particular adaptability for the actuation of dual motion transmitting devices, preferably in the form of push-pull cables wherein a core slidably reciprocates within a casing.

Such push-pull cables are readily adapted to transmit the motion, and forces, necessary to stroke the hydrostatic transmissions. And, in the environment of stroking the swash plate in each of two hydrostatic transmissions wherein the inclination of only one swash plate is variable, the gate plate aperture comprises at least one lozenge within which the control lever can be selectively moved to coordinate the motion transmitted by one of the two push-pull cables with respect to the motion transmitted by the other. Specifically, the lozenge has a vertex at its longitudinal extremity which, when engaged by the control

3 lever, provides maximum rotation of the yoke about the primary axis but substantially no rotation about the secondary axis so that the cores of both push-pull cables will be displaced an equal amount in the same direction. The lozenge also has two, laterally opposed extremities, or apexes, which, when engaged by the control lever provide maximum rotation of the yoke about the secondary axis for a predetermined degree of rotation about the primary axis so that the displacement of one core resulting from rotation of the yoke about the primary axis will be emphasized and the displacement of the other core will be minimized.

In addition, the gate plate aperture may include a slot means in which the control lever may be selectively moved to permit maximum rotation of the yoke about the secondary axis with substantially no rotation about the primary axis so that the two cores are displaced in substantially equal increments in opposite directions.

One preferred embodiment is shown by way of example in the accompanying drawings and described in detail without attempting to show all of the various forms and modifications in which the invention might be embodied; the invention being measured by the appended claims and not by the details of the specification.

DESCRIPTION OF THE PREFERRED EMBODIMENT

Figure 1:
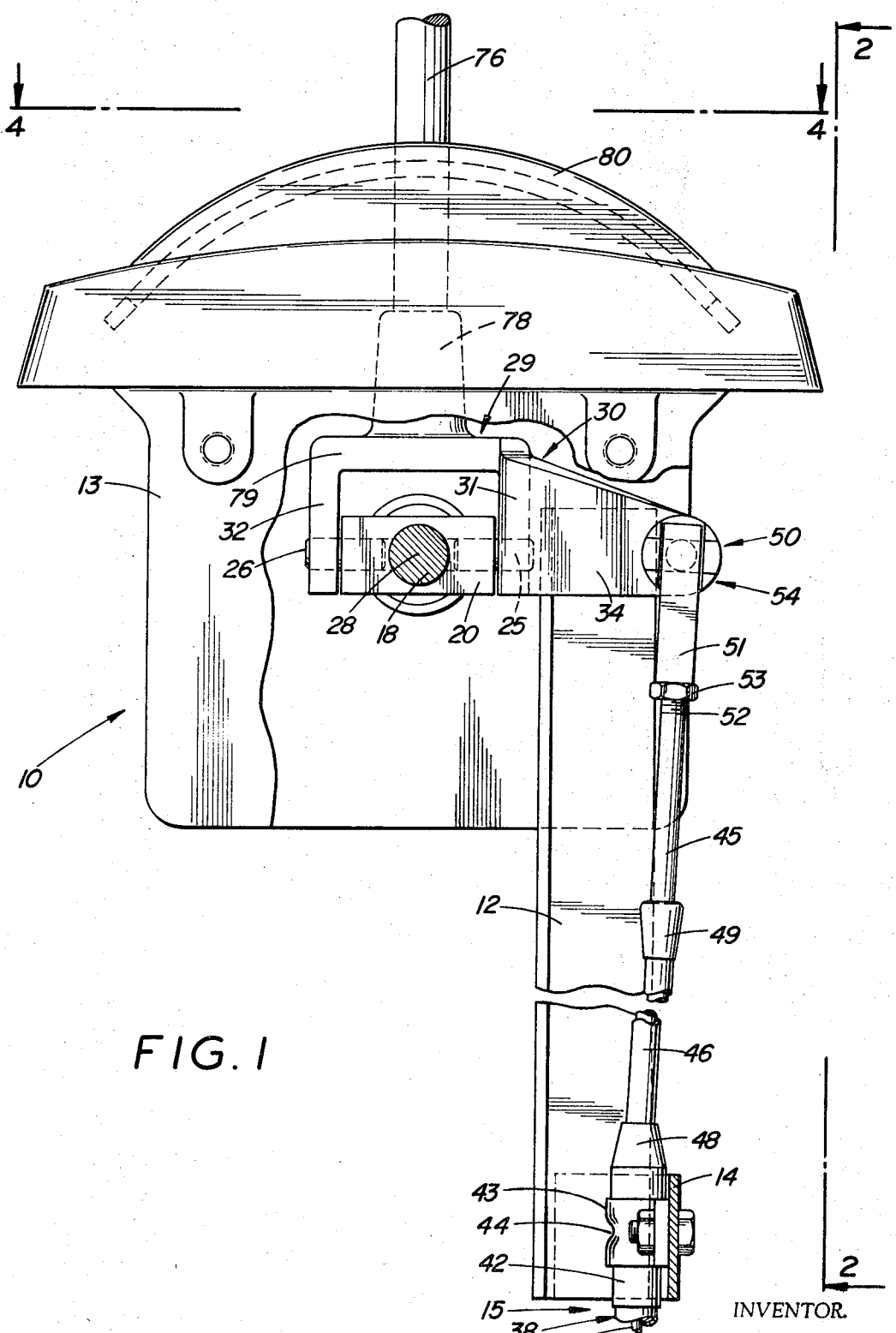
FIG. 1 is a side elevation, partly broken away and partly in section, of a control unit embodying the concept of the present invention and depicting the control lever in the neutral position.
Figure 2:
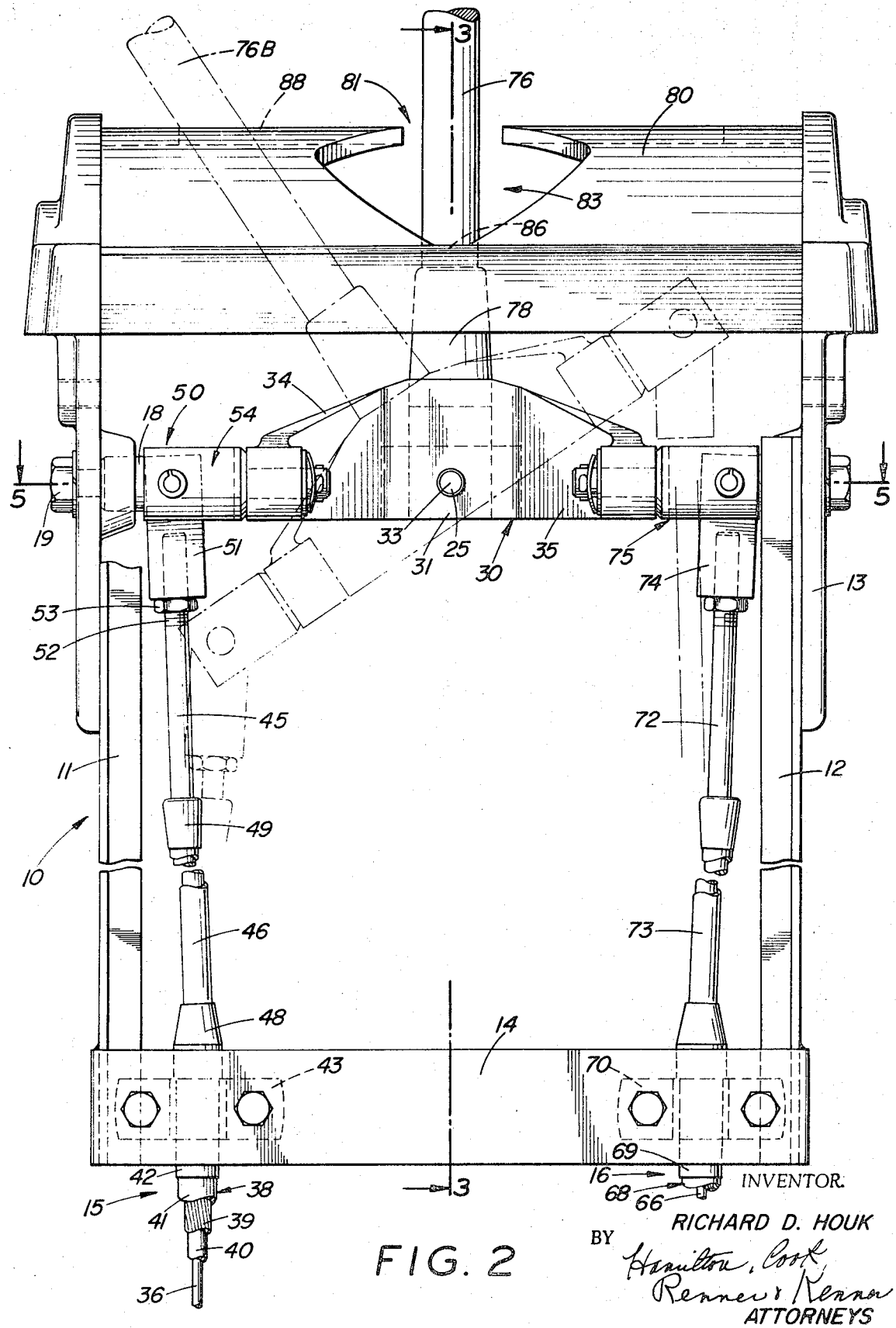
FIG. 2 is an end elevation taken substantially on line 2—2 of FIG. 1 and depicting, in solid line, the control lever in neutral position, and, in phantom, the control lever and associated mechanism in the full, left, spin position.

Referring more particularly to the drawings, a control unit embodying the concept of the present invention is designated generally by the numeral 10. A pair of spaced hanger plates 11 and 12 are secured to, and depend from, the housing 13 of the control. A foot shelf 14 is affixed between the hanger plates 11 and 12 in spaced relation below the housing 13 for mounting the motion transmitting devices 15 and 16, as more fully hereinafter set forth.

A beam 18 (best seen in FIG. 5) extends between opposed sides of the housing 13 and is fixed therein, as by cap screws 19. A quill 20 is rotatably mounted on the medial portion of beam 18 and is retained against axial movement with respect to the beam 18 by a pair of spaced ring-collars 21 and 22 that are received in appropriate annular grooves 23 and 24 provided on the surface of beam 18 so as to embrace the quill 20 and prevent it from moving axially of beam 18.

Figure 3:
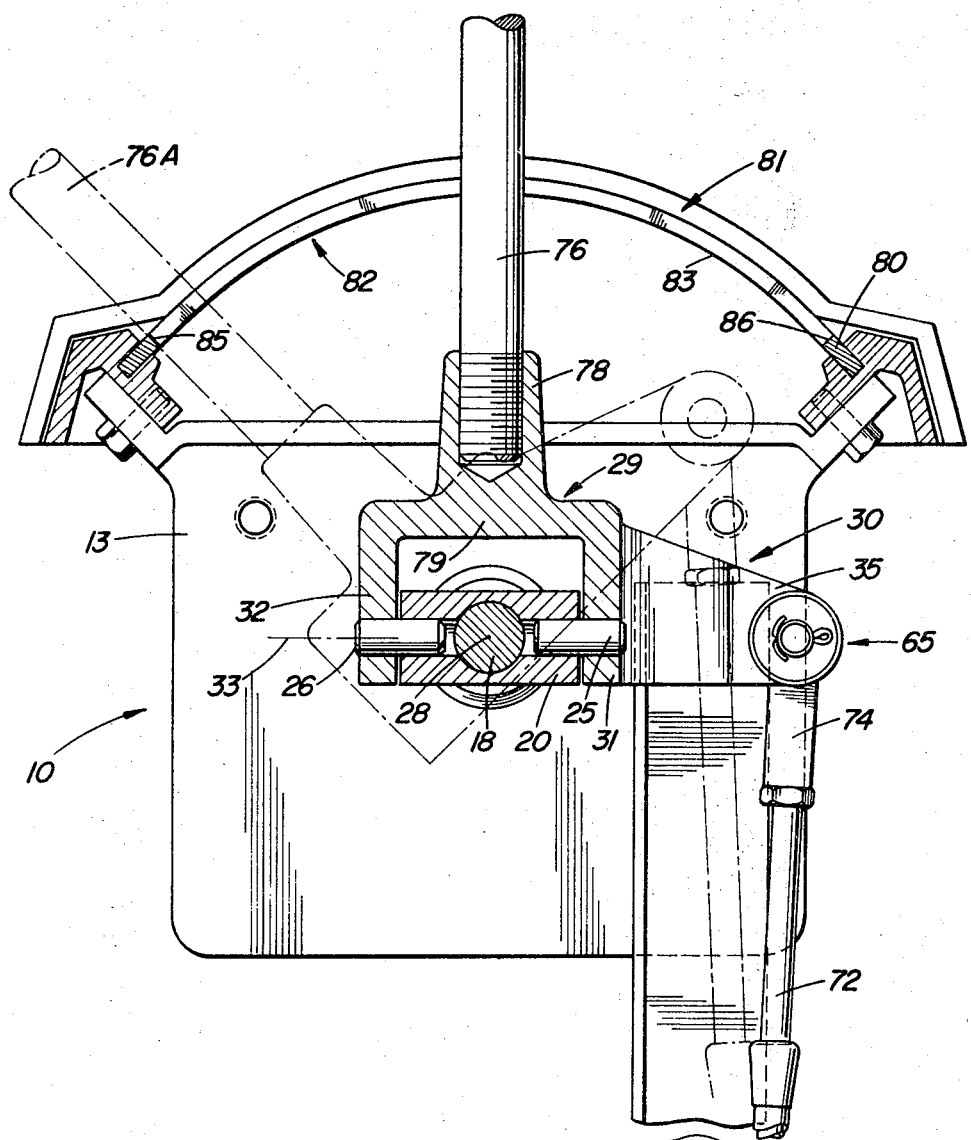
FIG. 3 is a vertical cross section taken substantially on line 3—3 of FIG. 2 and depicting, in solid line, the control lever in neutral position, and, in phantom, the control lever and associated mechanism in the full forward drive position.

A pair of oppositely directed gudgeon pins 25 and 26 extend outwardly from the quill 20 generally transversely the axis 28 of the beam 18. The stirrup portion 29 (FIG. 3) of a yoke, indicated generally by the numeral 30, is rotatably supported on the gudgeon pins 25 and 26. As best seen in FIG. 3, the spaced legs 31 and 32 of the stirrup portion 29 receive the gudgeon pins 25 and 26 so that the yoke 30 is rotatable about an axis 33 transversely the axis 28 of beam 18.

The yoke 30 also has a pair of arms 34 and 35 that extend outwardly from the stirrup portion 29. As shown, the arms 34 and 35 extend outwardly from stirrup leg 31 symmetrically with respect to the rotational axis 33. The ends of the arms 34 and 35 are respectively adapted for operative connection to motion transmitting devices 15 and 16.

The motion transmitting device 15 is preferably a push-pull control cable and may be of any conventional construction in which a core 36 slidably reciprocates within a casing, indicated generally by the numeral 38, to transmit mechanical motion by the application of tensile or compressive forces to the core 36 while at least the ends of the casing 38 are clamped in a relatively fixed position with respect to the core.

In the exemplary construction depicted, the casing 38 is formed of a plurality of casing wires 39 laid contiguously, in the form of a long pitched helical coil, about the radially outer surface of an inner, flexible, plastic tube 40 that extends the full length of the casing 38. An outer cover 41 encases the coil of wires 39 up to within a short distance from the ends thereof. A fitting 42 is positioned over the end of the cable casing 38 and is cold swaged, or otherwise suitably connected, onto the exposed portion of the cylindrical grouping of wires 39. A plurality of ribs, not shown, may be provided within the end fitting 42 which, when crimped onto the outer cover 41, effects a seal between the end fitting 42 and the cover 41.

The end fitting 42 is secured to the foot shelf 14 by a clamp 43. In the exemplary construction depicted in FIG. 1 the clamp 43 is provided with a dimple 44 which interfits with an annular recess (not shown) on the end fitting 42 to assure a fixed location for the end of the cable casing 38 with respect to its own axis.

The end rod 45, which is secured to the cable core 36 in a well-known fashion so as to become, in effect, an extension thereof, is closely received within an extension tube 46 that is gyrationally mounted on the end fitting 42. The gyrational mounting, which is generally a modified ball and socket arrangement (not shown), is preferably protected by a resilient sealing sleeve 48. A similar resilient sealing sleeve 49 is also preferably positioned where the end rod 45 enters the extension tube 46. The tube 46 not only guides the rod 45 as it slides therein but also prevents excessive deflection of that portion of the core 36 which slides therein, particularly when subjected to compressive loads.

The end rod 45 is connected to arm 34 of yoke 30 by a universal connection 50. Specifically, the base portion of a swing block 51 is bored and tapped to receive the threaded terminal portion 52 of end rod 45, and a lock nut 53 secures the attachment therebetween. The swing block 51 is mounted for transverse oscillation on a clevis stud 54 that is, in turn, rotatably mounted on arm 34.

Figure 5:
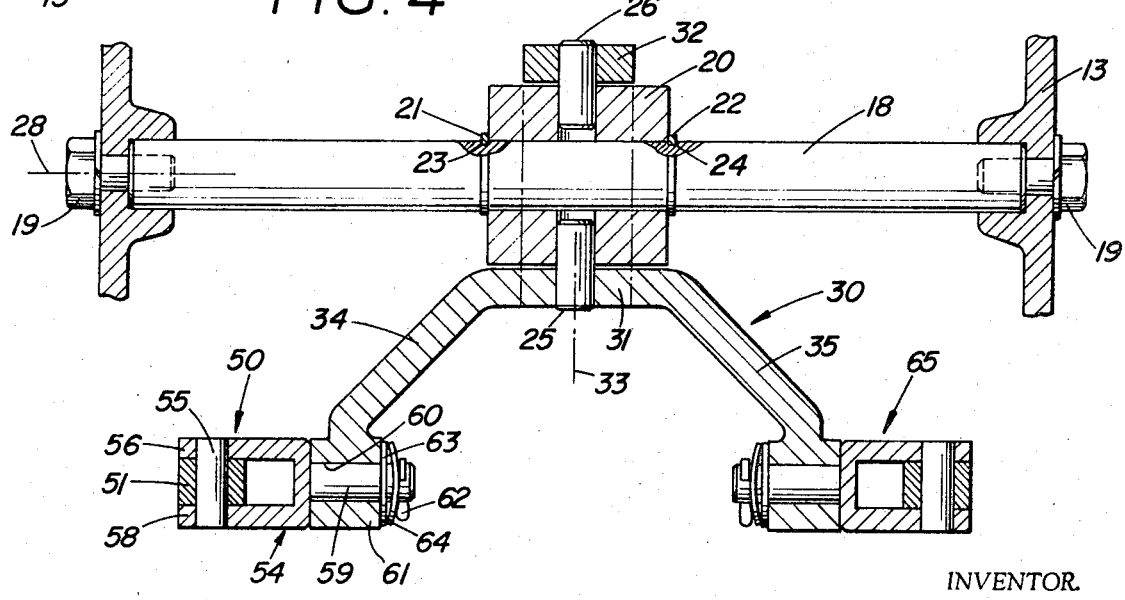
FIG. 5 is a partial horizontal section taken substantially on line 5—5 of FIG. 2; and, FIG. 6 is an end elevation similar to FIG. 2, but partly broken away, depicting the control lever moved to the maximum right, swing-turn position.

As best seen in FIG. 5, a pivot pin 55 is secured to, and extends between, the spaced legs 56 and 58 of the clevis stud 54. The swing block 51 is oscillatory therabout. A stem 59 of reduced diameter extends axially of the clevis stud 54 and is journaled in a bore 60 through a boss 61 on the end of yoke arm 34. A cotter pin 62 pierces the stem 59 to secure the clevis stud 54 to the boss 61, and a flat washer 63 in combination with a spring washer 64 are positioned between the cotter pin 62 and the boss 61 to stabilize the clevis stud 54 on yoke arm 34 and yet permit unrestricted rotation therebetween. The connection 50 accordingly permits rotation of yoke 30—and thus arm 34—about the two axes 28 and 33 without binding the end rod 45 so that it may slide axially of the extension tube 46 in response to the various rotations of yoke 30.

A universal connection 65, similar to universal connection 50, connects the motion transmitting device 16 to yoke arm 35. The motion transmitting device 16 is also preferably a push-pull control cable and may be of any conventional construction. The exemplary push-pull cable 16 depicted is of the same construction as cable 15, and has, therefore, a core 66 that slidably reciprocates within a casing, indicated generally by the numeral 68, to transmit mechanical motion by the application of either tensile or compressive forces to the core 66 when at least the ends of the casing 68 are clamped in relatively fixed position with respect to the core 66.

A fitting 69 affixed to the casing 68 is also secured to the foot shelf 14, as by a clamp 70 dimpled at 71, and an end rod 72 is secured to the cable core 66 in a well-known fashion so as to become, in effect, an extension thereof. The end rod 72 is also slidably received within an extension tube 73 gyrationally mounted on the end fitting 69 and connected to a swing block 74 supported for oscillatory motion on a clevis stud 75 rotatably carried on arm 35.

A control lever 76 is seated in a socket 78 presented on the web 79 of the stirrup portion 29 of yoke 30 and extends upwardly through a gate plate 80 mounted on the housing 13.

The gate plate aperture, indicated generally by the numeral 81, has a unique configuration to assure coordinated operation of the two motion transmitting, push-pull cable devices 15 and 16, and can best be understood if explained in conjunction with a typical environment. Accordingly, it may be assumed that the control unit 10 is being used to operate a tracklayer vehicle in which the motion transmitting device 15 strokes the swash plate in the hydrostatic transmission that drives the left track and in which the motion transmitting device 16 strokes the swash plate in a hydrostatic transmission that drives the right track. Additionally, it may be assumed that starting from neutral, as a frame of reference, motion imparted to the cores of the push-pull control cables by the application of tensile forces stroke the swash plates to drive the tracks in a direction tending to move the vehicle forwardly, and, conversely, motion imparted to the cores of the push-pull cables by the application of compressive forces stroke the swash plates to drive the tracks in a direction tending to move the vehicle in reverse.

When the hydrostatic transmissions stroked by push-pull cables 15 and 16 are in neutral, the control lever 76 is in the position depicted by the solid line representation in FIGS. 1–4. In this position the end rods 45 and 72, attached to the cores 36 and 66 of push-pull cables 15 and 16, respectively, can be selectively extended from or retracted within their corresponding extension tubes 46 and 73 by the application of tensile or compressive forces to pull and/or push the cores 36 and 66 with respect to their casings 38 and 68.

The unique configuration of the aperture 81 in gate plate 80 selectively limits rotation of the control lever 76 about either axis 28 or 33 with respect to the other and thereby assures coordinated operation of the two push-pull cables 15 and 16, and, in the exemplary environment chosen for discussion, the two hydrostatic transmissions. As viewed in FIG. 4, the aperture 81 has three general component areas: a substantially diamond-shaped forward drive and turn lobe, or lozenge, 82; an opposed, substantially diamond-shaped reverse drive and turn lobe, or lozenge, 83; and, a spin-turn slot 84 located medially of the forward and reverse lozenges 82 and 83. The remote extremities, or vertices, 85 and 86 of the lozenges 82 and 83 are oriented transversely of axis 28 so that an imaginary line therebetween would lie parallel to axis 33. In this way, movement of the control lever 76 along an arc, the plane of which includes the imaginary line between vertices 85 and 86, will rotate yoke 30 only about axis 28.

On the other hand, the spin-turn slot 84 is oriented transversely of axis 33 and parallel to axis 28 so that movement of the control lever 76 along slot 84 will rotate yoke 30 only about axis 33.

Rotation of the control lever 76 only about axis 28 from the neutral position located at the juncture 77 of lozenges 82 and 83—viz., where the extremities, or vertices, of each lozenge 82 and 83 opposite vertices 85 and 86 are superimposed—toward the vertex 85 and the full forward drive position 76A (the chain line representation in FIG. 3) occasions rotation of the yoke 30 about axis 28 so that a simultaneous withdrawal motion is imparted to both end rods 45 and 72, and in substantially equal increments. This simultaneous application of a tensile force to both cores 36 and 66 strokes the two swash plates such that the right and left tracks are driven at the same speed and the vehicle moves forwardly. The full forward position 76A portrays the fully stroked position of the hydrostatic transmissions driving both tracks and thereby the maximum forward speed of the tracklayer vehicle. Intermediate positions represent correspondingly intermediate speeds.

Retro-rotation of the control lever 76 only about axis 28 from the full forward position 76A applies a compressive force to both cores correspondingly to reduce the forward speed of the vehicle, and, if such rotation is continued from lozenge 82 into lozenge 83, the vehicle will stop (at the superimposed fourth extremity 77 of lozenges 82 and 83) and then proceed in reverse. Full speed in reverse would be accomplished when the control lever 76 is moved against vertex 86.

A spin-turn slot 84 intersects the lozenges at the superimposed vertices forming their juncture 77. Movement of the control lever 76 through the spin-turn slot 84 occasions rotations of the yoke 30 only about axis 33 so that the two cores 36 and 66 are displaced in opposite directions. Should, for example, the control lever 76 be moved from the neutral position (depicted by the solid line representation in FIG. 2) through the left spin-turn slot 88 toward the left spin-turn position 76B (depicted by the chain line representation in FIG. 2) the resulting rotation of yoke 30 will impart an insheathing movement of end rod 45 with respect to extension tube 46, and, simultaneously, a withdrawal movement of rod 72 with respect to extension tube 73. The resulting, oppositely directed displacements of the two cores 36 and 66 will stroke the corresponding hydrostatic transmissions so that the right track will tend to drive the vehicle forwardly and the left track will tend to drive the vehicle in reverse. As a result, the vehicle will turn to the left about a vertical axis located medially of the two tracks—i.e., the vehicle will "spin-turn" without appreciable forward or reverse movement.

Retro-rotation of the control lever 76 only about axis 33 from the full left spin-turn position 78B applies opposite movement to the two cores 36 and 66 correspondingly to decrease the speed at which the vehicle tracks are turning, and, if such rotation of the control lever 76 is continued from the left spin-turn slot 88 into the right spin-turn slot 89 the vehicle will stop and then spin-turn to the right.

At this point it will be appreciated what motion a tracklayer vehicle will evidence from the subject control 10 in response to pure rotation of the control lever 76 about either axis 28 or axis 33. In addition to such pure rotation, however, compound and/or sequential rotations are also available to the control lever 76 within either the forward drive and turn lozenge 82 or the reverse drive and turn lozenge 83.

The functional interaction of the control lever 76 with the lozenges 82 and 83, is, except for direction, sufficiently identical that only the interaction of the control lever 76 with, and its movement within, the forward drive and turn lozenge 82 need be discussed in detail to provide a complete understanding of the function of lozenges 82 and 83.

Figure 4:
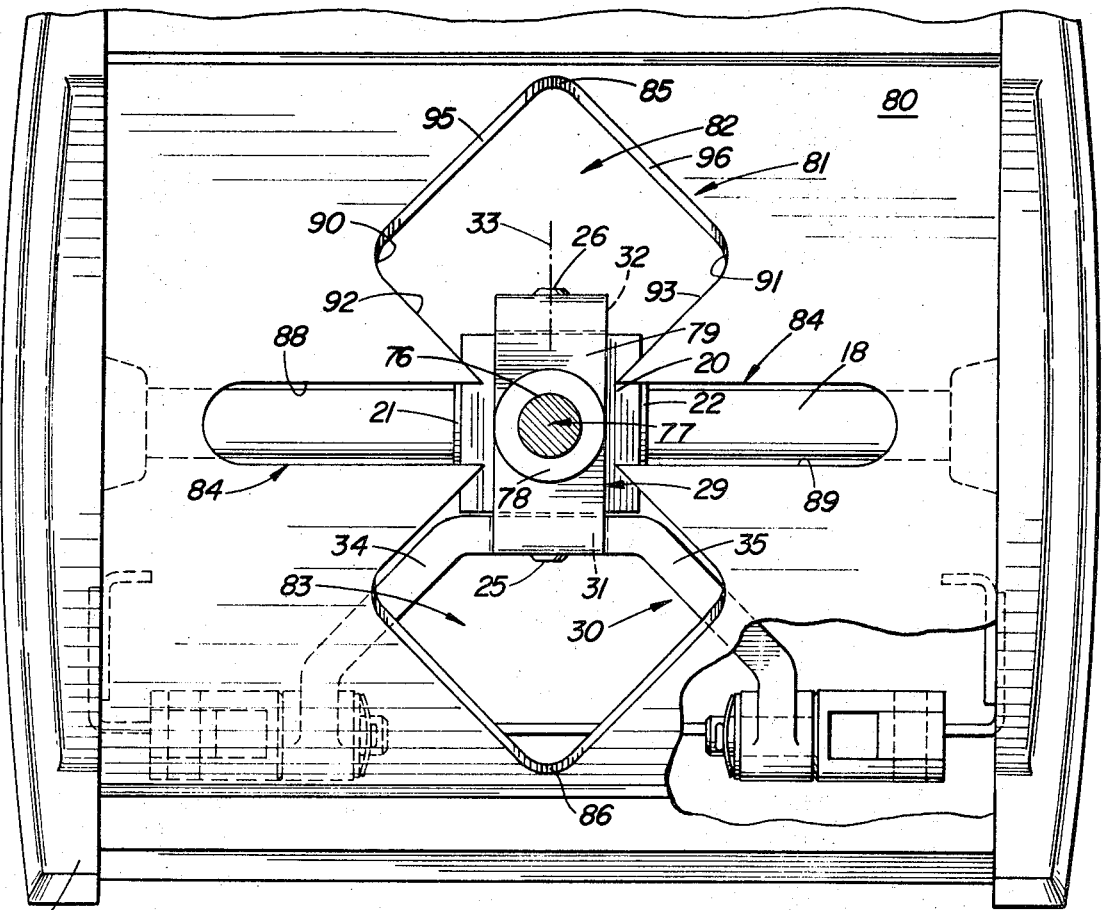
FIG. 4 is a top plan taken substantially on line 4—4 of FIG. 1.

A pair of opposed, spaced, lateral apexes 90 and 91 define two lateral extremities and therefore the widest expanse of lozenge 82, as viewed in FIG. 4, and mark the maximum pivot-turn position, left and right, respectively.

The two edges 92 and 93 of lozenge 82 that converge from the lateral apexes 90 and 91 toward the juncture of the two lozenges 82 and 83, define, respectively, the left and right pivot-turn stops. Within lozenge 82 the control lever 76 may compound rotate—i.e., rotate simultaneously about axes 28 and 33—or it may sequentially rotate—i.e., sequentially about one axis 28 or 33 and then the other.

Figure 6:
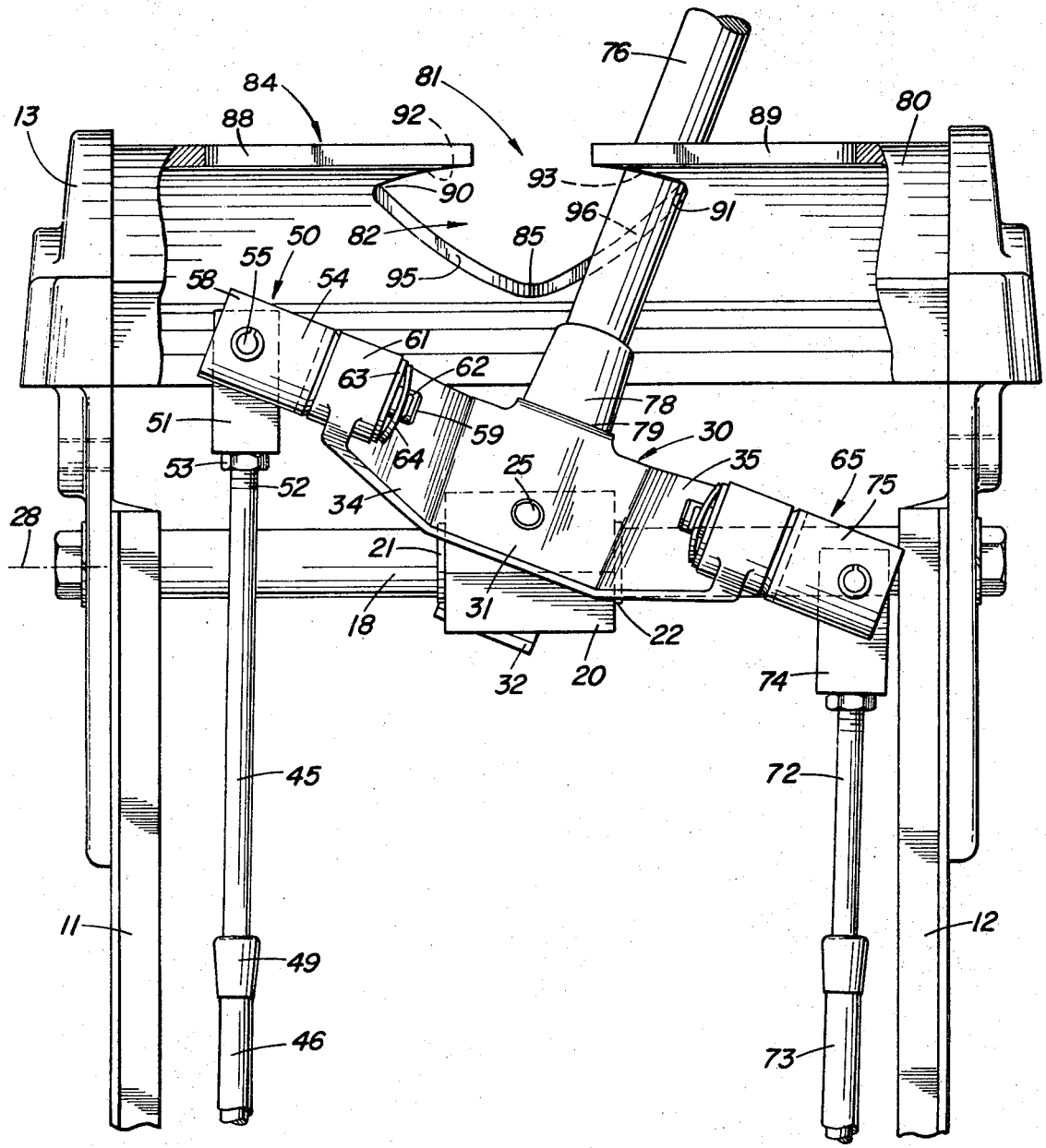

Accordingly, as long as the control lever 76 is within lozenge 82 the yoke 30 will have been subjected to primary rotation about axis 28 and both tracks will, as a result, tend to drive the vehicle forwardly. However, so long as the control lever 76 is within lozenge 82 the yoke may also be subjected to secondary rotation about axis 33. And, it does not matter whether the primary or secondary rotations are simultaneous or sequential. In either event, any secondary rotation will emphasize the motion imparted to the core of one push-pull cable and minimize the motion imparted to the core of the other push-pull cable. For example, should the control lever 76 be rotated about axis 28 so as to impart a withdrawal motion to both end rods 45 and 72—and thus drive the vehicle forwardly—and either simultaneously or sequentially be rotated about axis 33 in a clockwise direction, as viewed in FIG. 6, the withdrawal motion of end rod 45 will be emphasized and thereby increase the forward speed of the left track. At the same time, rotation of yoke 30 about axis 33 will minimize the extension of end rod 72 and thereby reduce the forward speed of the right track with respect to the speed of the left track. This will turn the vehicle to the right.

As long as the control lever is within the forward pivot-turn range—that portion of lozenge 82 between the neutral position of control lever 76 and an imaginary line joining the lateral apexes 90 and 91—engagement of the control lever 76 with the pivot-turn stops 92 or 93 limits the degree to which the yoke 30 can be rotated about the secondary axis 33. The divergence of the pivot-turn stops 92 and 93 away from the neutral position is selected on the basis that for turns initiated while the vehicle is traveling forwardly at speeds produced by positioning the control lever within the pivot-turn range, the track on the inner side of the turn should not be permitted to drive in a reverse direction. Continuing, then, with the example of a right turn, so long as the control lever is in engagement with the pivot-turn stop 93 the rotation of yoke 30 about the secondary axis 33 shall be coordinated with the degree of rotation of yoke 30 about the primary axis 28 so that the right track will not be permitted to drive in a reverse direction.

Thus, with the control lever 76 fully engaged against the pivot-turn stop 93 out to, and including, the lateral apex 91 the yoke 30 will have been displaced from its neutral position by rotational components about both axis 28 and axis 33. The rotational component about axis 28 will have tended to withdraw both end rods 45 and 72, and the rotational component about axis 33 will further tend to withdraw end rod 45 but will tend to insheath the end rod 72 so as to maintain it in neutral. The divergence of the pivot-turn stops 92 and 93 away from the neutral position, together with the lateral spacing of the apexes 90 and 91, may, as shown in FIG. 4, be such that movement of the control lever 76 along, for example, the pivot turn-stop 93 to the lateral apex 91 (FIG. 6) will, because of the canceling effect of rotating arm 35 about both axes 28 and 33, result in no motion of the end rod 72 with respect to its extension tube 73. As such, the right track will remain motionless. At the same time, however, the end rod 45 will be withdrawn by the additive effect of the primary and secondary rotations imparted to arm 34 so that the speed of the left track will be increased with respect to that incident to rotation of the yoke 30 about only the primary axis 28. Accordingly, as the speed of the left track is thus increased with respect to the right track (which drives neither forwardly nor reversely) the tracklayer vehicle will turn to the right about a vertical axis extending through the right track. A turn of this nature is termed a "pivot-turn," and the maximum pivot-turn speed, left or right, is obtained when the control lever 76 engages the lateral apexes 90 or 91, respectively.

It must be appreciated, however, that less severe turns can be made when the control lever 76 is within the pivot-turn range—the rate at which the vehicle is turned depending upon the relative degree at which the yoke is rotated about axis 33 with respect to the rotation about axis 28. The degree to which the yoke is rotated about axis 33 regulates the relative speeds of the two tracks with respect to each other and the degree to which the yoke is rotated about axis 28 primarily regulates the forward speed of the vehicle and secondarily the relative speeds of the two tracks by the additive effect of the core displacement.

The two edges 95 and 96 of lozenge 82 that converge from the lateral apexes 90 and 91 toward the vertex 85 define, respectively, the left and right swing-turn stops. As long as the control lever is within the forward swing-turn range—that portion of lozenge 82 between the vertex 85 and an imaginary line joining the lateral apexes 90 and 91—the swing-turn stops further limit the degree to which the yoke 30 can be rotated about the secondary axis 33 with respect to the primary axis 28. The convergence of stops 95 and 96, as shown in FIG. 4, is selected on the basis that for turns initiated while traveling forwardly at speeds produced by positioning the control lever 76 within the swing-turn range, the track on the inner side of the turn, while slowing, should not be permitted to slow sufficiently to eliminate its forward drive. Moreover, the degree to which the forward speed of that track located on the inner side of the turn should be reduced should be an inverse function of the forward speed of the vehicle so that the axis about which the tracklayer vehicle turns will be progressively more remote from the vehicle as the forward speed thereof is increased—i.e., the vehicle should "swing-turn."

The same coordination is imparted to left turns and to operation of the control lever within the reverse lozenge 83 so that it should now be apparent how the aperture 81, in cooperative interaction with control lever 76, maintains coordinated rotation of the yoke 30 to regulate both the direction and speed of the tracklayer vehicle with which the control unit 10 is associated.

It should, therefore, now be apparent that a control unit embodying the concept of the present invention is not only capable of effecting coordinated control of two motion transmitting devices with protection against incompatible operation thereof but also accomplishes the other objects of the invention.

I claim:

1. A control unit for coordinated actuation of two motion transmitting devices, said control unit comprising, a housing, a beam supported in said housing, a yoke having a pair of outwardly extending arm means, said yoke being carried on said beam by means for rotation both about the axis of said beam and about an axis transversely thereof, each said arm means being adapted for operative connection to a motion transmitting device remotely of both the axes about which said yoke is rotatable, and a control lever for selectively rotating said yoke.

2. A control unit for coordinated actuation of two motion transmitting devices, said control unit comprising, a housing, a beam supported in said housing, a yoke having a pair of outwardly extending arm means, said yoke being carried on said beam by means for rotation both about the axis of said beam and about an axis transversely thereof, each said arm means being adapted for operative connection to a motion transmitting device, a control lever for selectively rotating said yoke, a gate plate secured to said housing, said gate plate being apertured to receive the control lever therethrough, the interaction of said control lever with the aperture in said gate plate maintaining coordinated rotation of the yoke about one axis with respect to the other, at least one portion of said aperture presenting a vertex, said vertex oriented to permit maximum rotation of the yoke about the first of said axes with substantially no rotation about the second of said axes.

3. A control unit, as set forth in claim 2, in which the aperture also presents a pair of opposed, lateral apexes, said apexes oriented to permit maximum rotation of the yoke about the second of said axes at a preselected degree of rotation about the first of said axes.

4. A control unit, as set forth in claim 3, in which the control lever has a neutral position and in which the vertex and said opposed apexes define three extremities of a lozenge, the neutral position of said control lever defining the fourth extremity of said lozenge, four edges joining said extremities, said four edges defining stops for coordinated limitation of the degree to which said yoke may rotate about the second of said axes with respect to any degree of rotation of the yoke about the first of said axes throughout the range thereof.

5. A control unit, as set forth in claim 4, in which the aperture in said gate plate has an additional lozenge forming a pair of opposed lozenges communicating at superimposed vertices, said superimposed vertices defining the neutral position of said control lever.

6. A control unit, as set forth in claim 5, in which a slot intersects the superimposed vertices of said opposed lozenges, said slot being oriented to permit maximum rotation of the yoke about the second of said axes with substantially no rotation about the first of said axes.

7. A control unit, as set forth in claim 4, in which a slot intersects the fourth extremity of said lozenge, said slot being oriented to permit maximum rotation of the yoke about the second of said axes with substantially no rotation about the first of said axes.

8. A control unit, as set forth in claim 2, in which at least one portion of the aperture in said gate plate presents a slot, said slot oriented to permit maximum rotation of the yoke about the second of said axes with substantially no rotation about the first of said axes.

9. A control unit in combination with two motion transmitting devices having coordinated actuation, each said motion transmitting device having a core that slidably reciprocates within a casing, said control unit comprising, a housing, a beam supported in said housing, a yoke having a pair of outwardly extending arm means, said yoke being carried on said beam by means for rotation both about the axis of said beam and about an axis transversely of said beam extending generally medially of said arm means, a control lever for selectively rotating said yoke, a gate plate having an aperture, said gate plate secured to said housing, said control lever extending through the aperture of said gate plate, the interaction of said control lever with the aperture in said gate plate maintaining coordinated limitation of the rotation of said yoke about one axis with respect to the other, a universal connecting means operatively connecting each said arm means to the core of one of the motion transmitting devices at a point spaced from the axis of said beam.

10. A control unit, as set forth in claim 9, in which at least one portion of the aperture in said gate plate presents a vertex and a pair of opposed, lateral apexes, said vertex and said lateral apexes defining three extremities of a lozenge, the neutral position of said control lever defining the fourth extremity of said lozenge, movement of said control lever within said lozenge providing coordinated actuation of the cores in the two motion transmitting devices, said vertex oriented to permit maximum rotation of the yoke about the axis of said beam with substantially no rotation of the yoke about the axis transversely thereof so that both said cores are dispalced in the same direction at equal increments, said apexes being oriented to permit maximum rotation of the yoke about the axis transversely of said beam at a preselected degree of rotation about the axis of said beam so that the displacement of one core resulting from rotation of the yoke about the axis of said beam will be emphasized and the displacement of the other core will be minimized.

11. A control unit, as set forth in claim 9, in which at least a portion of the aperture in said gate plate presents a slot, said slot being oriented to permit maximum rotation of the yoke about the axis transversely of said beam with substantially no rotation of the yoke about the axis of said beam so that the two cores are displaced in opposite directions.

References Cited

UNITED STATES PATENTS

| | | | |
|---|---|---|---|
| 2,691,080 | 10/1954 | Kellogg | 74—471 X |
| 3,350,957 | 11/1967 | Morse | 74—473 |
| 3,388,609 | 6/1968 | Miller | 74—471 |

MILTON KAUFMAN, Primary Examiner